July 27, 1965
E. J. ROTH
3,196,810
AUTOMATIC MACHINE FOR FORMING, CUTTING AND
DEPOSITING FILLED BAKED GOODS
Filed July 26, 1963
11 Sheets-Sheet 10
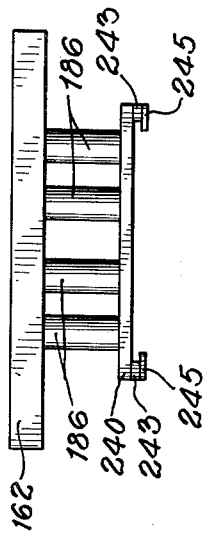
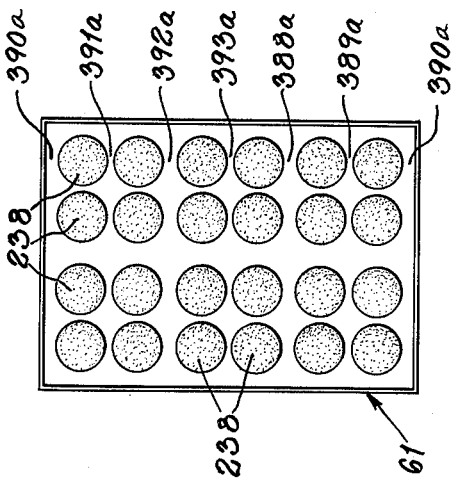
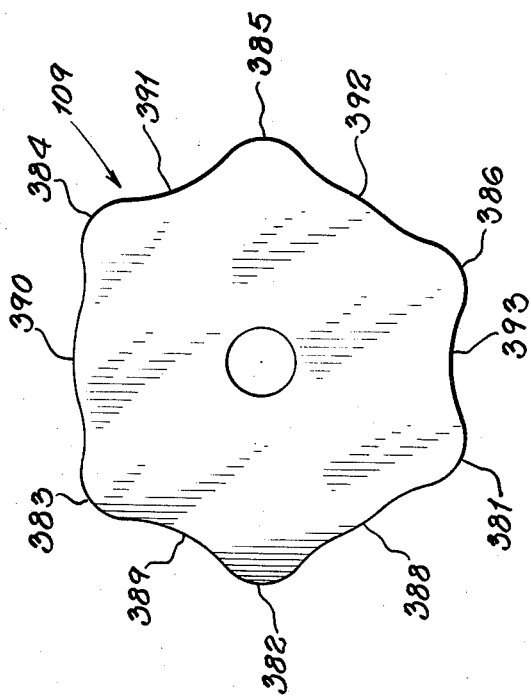
INVENTOR
ERNEST J. ROTH
BY
ATTORNEY

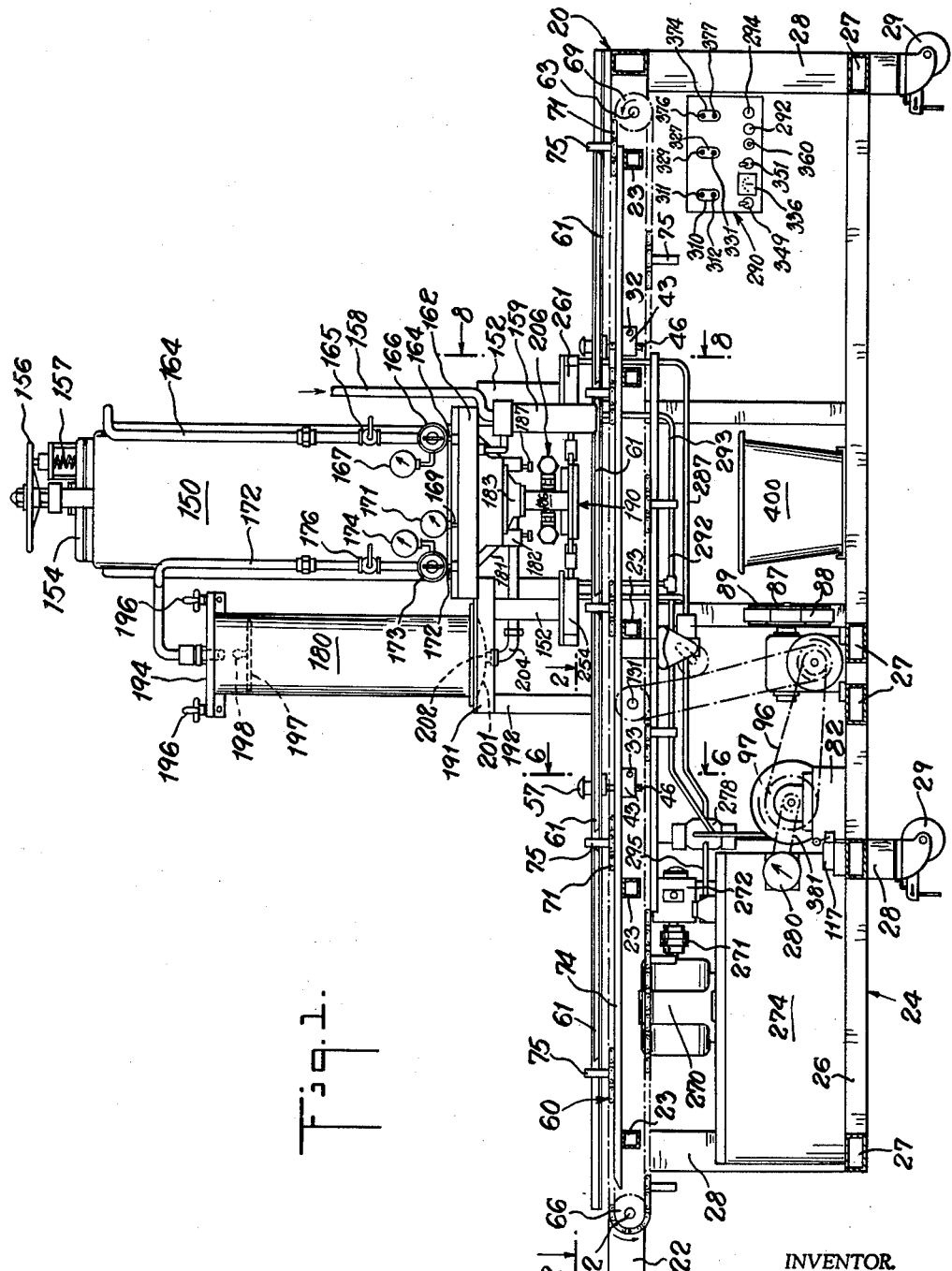

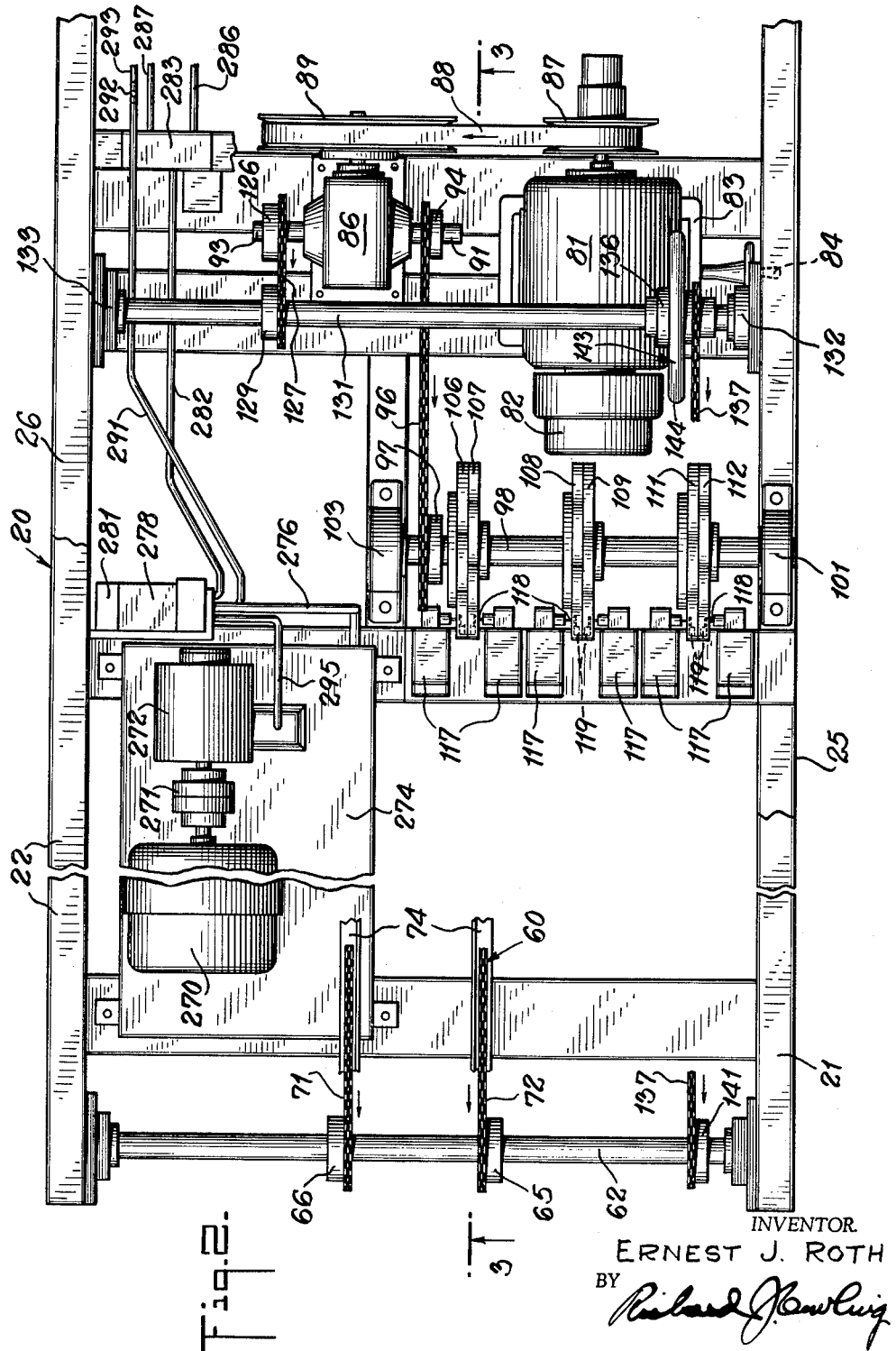

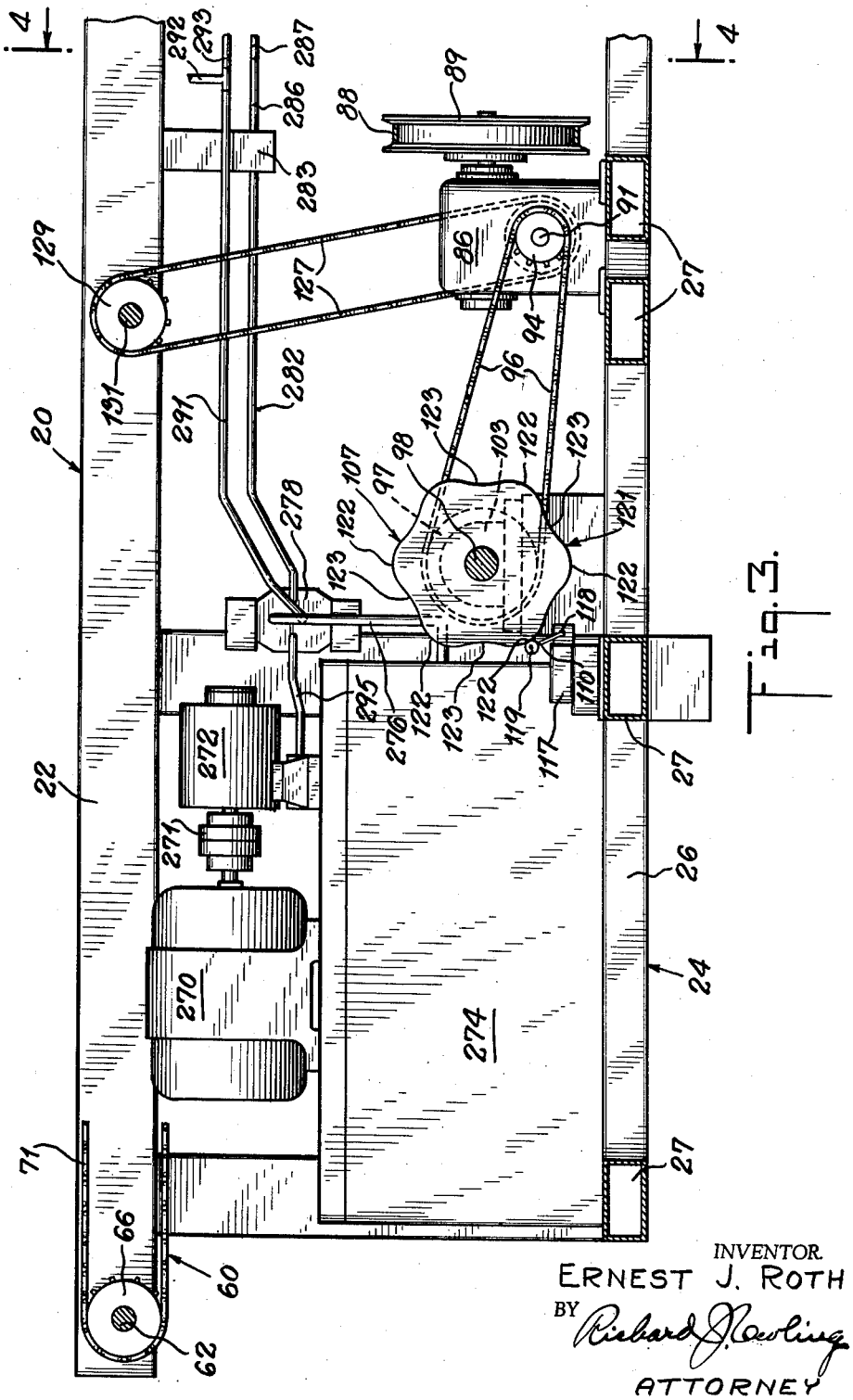

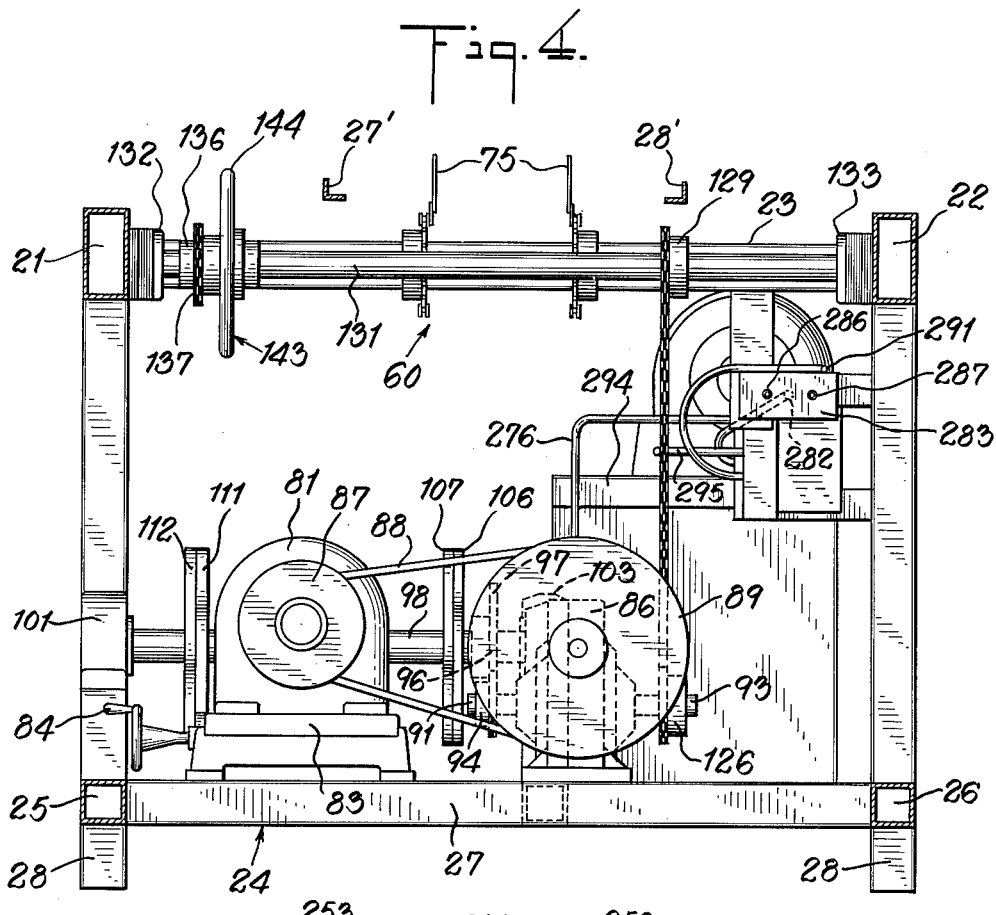
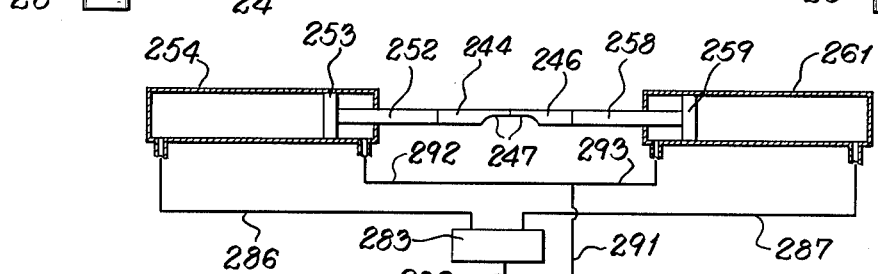
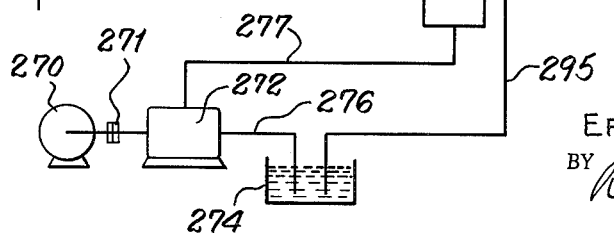

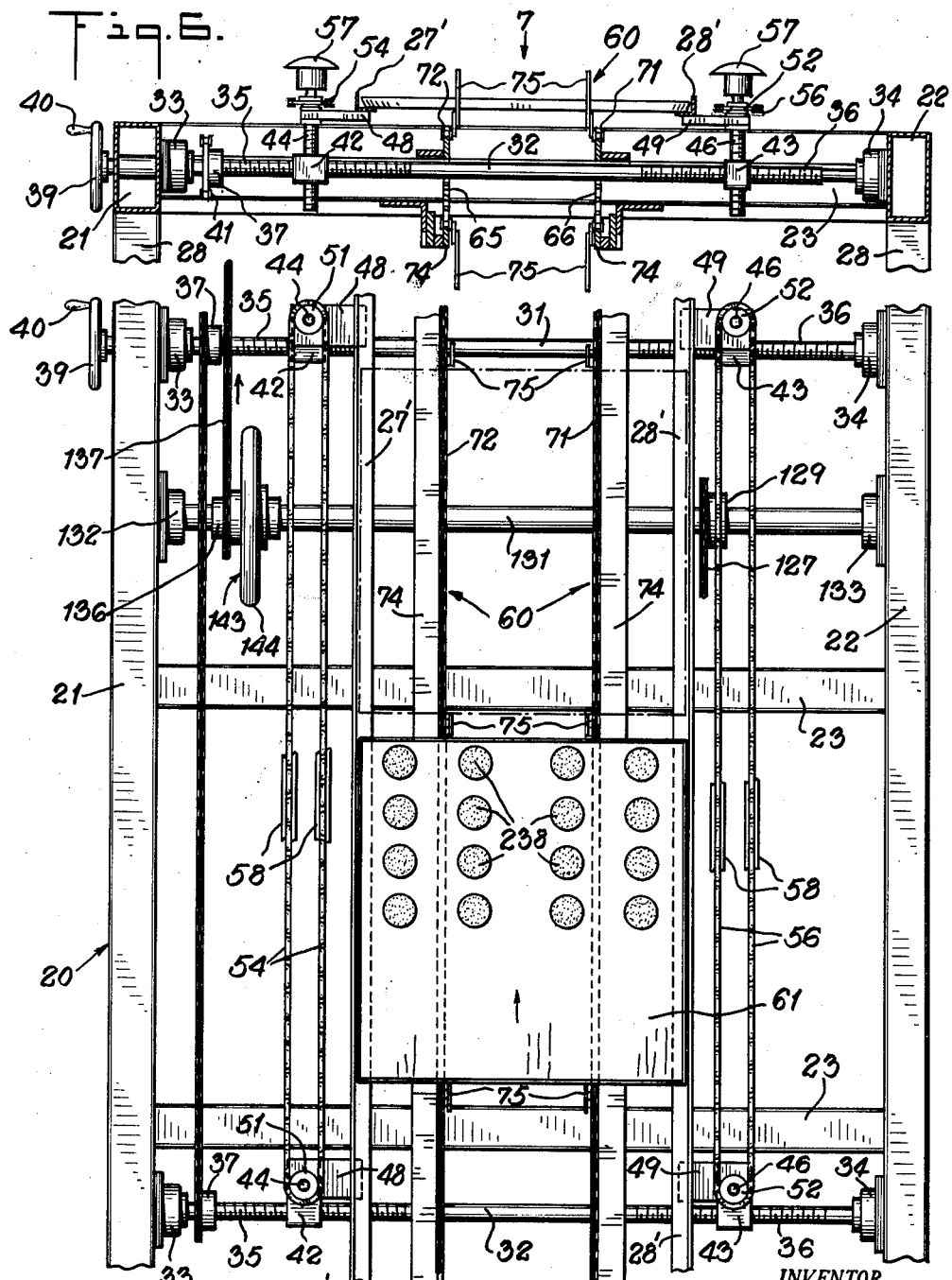

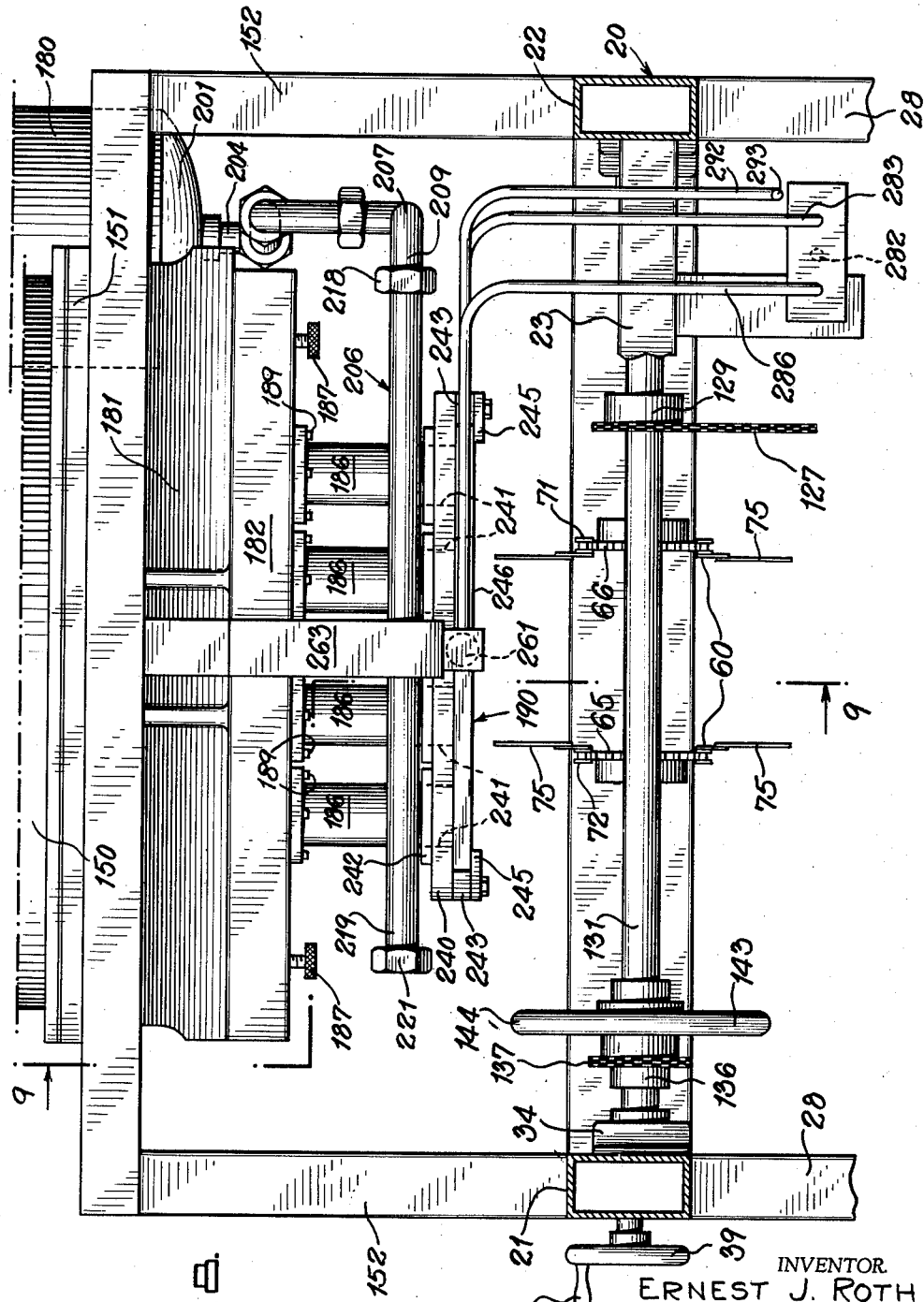

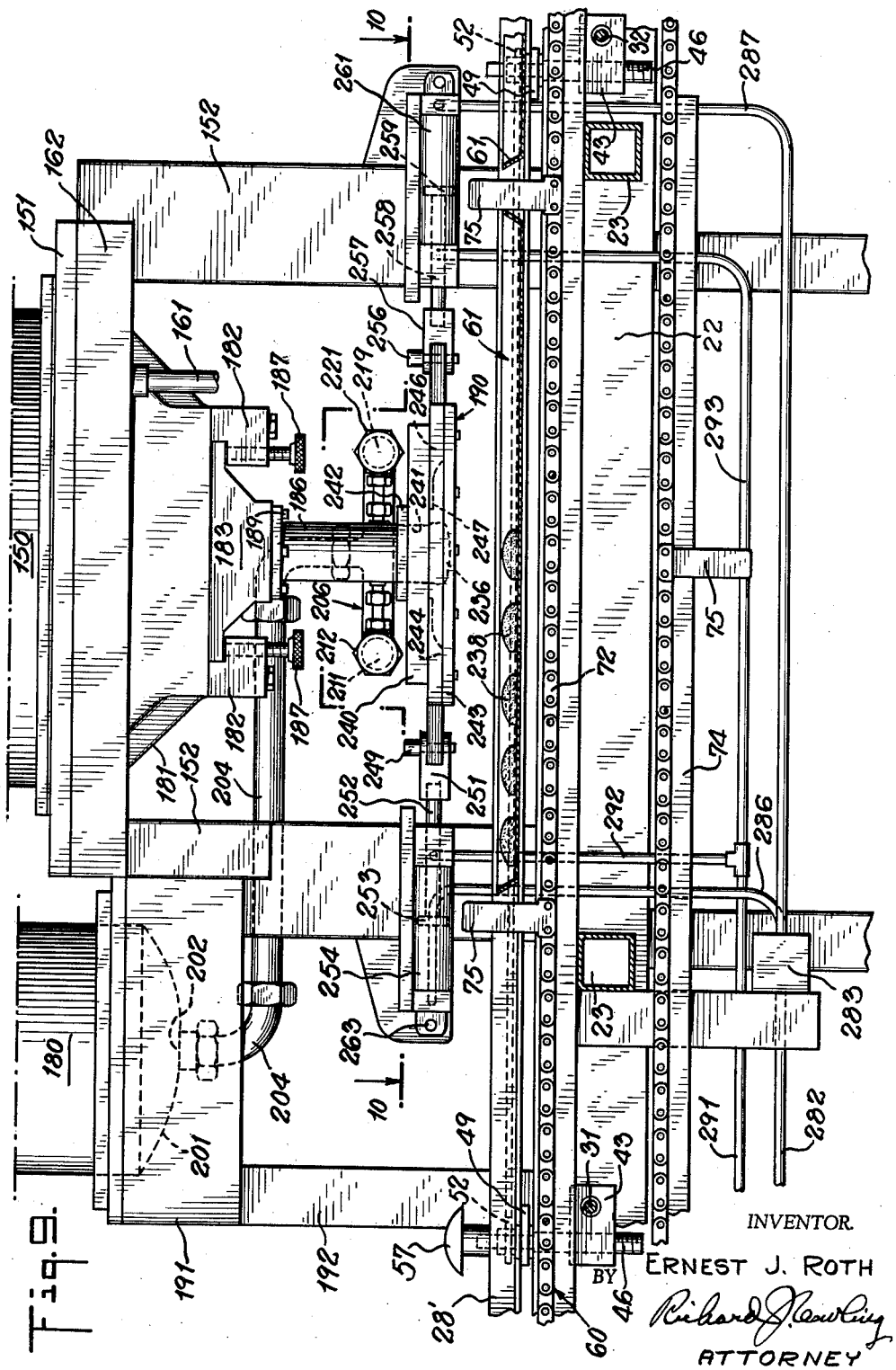

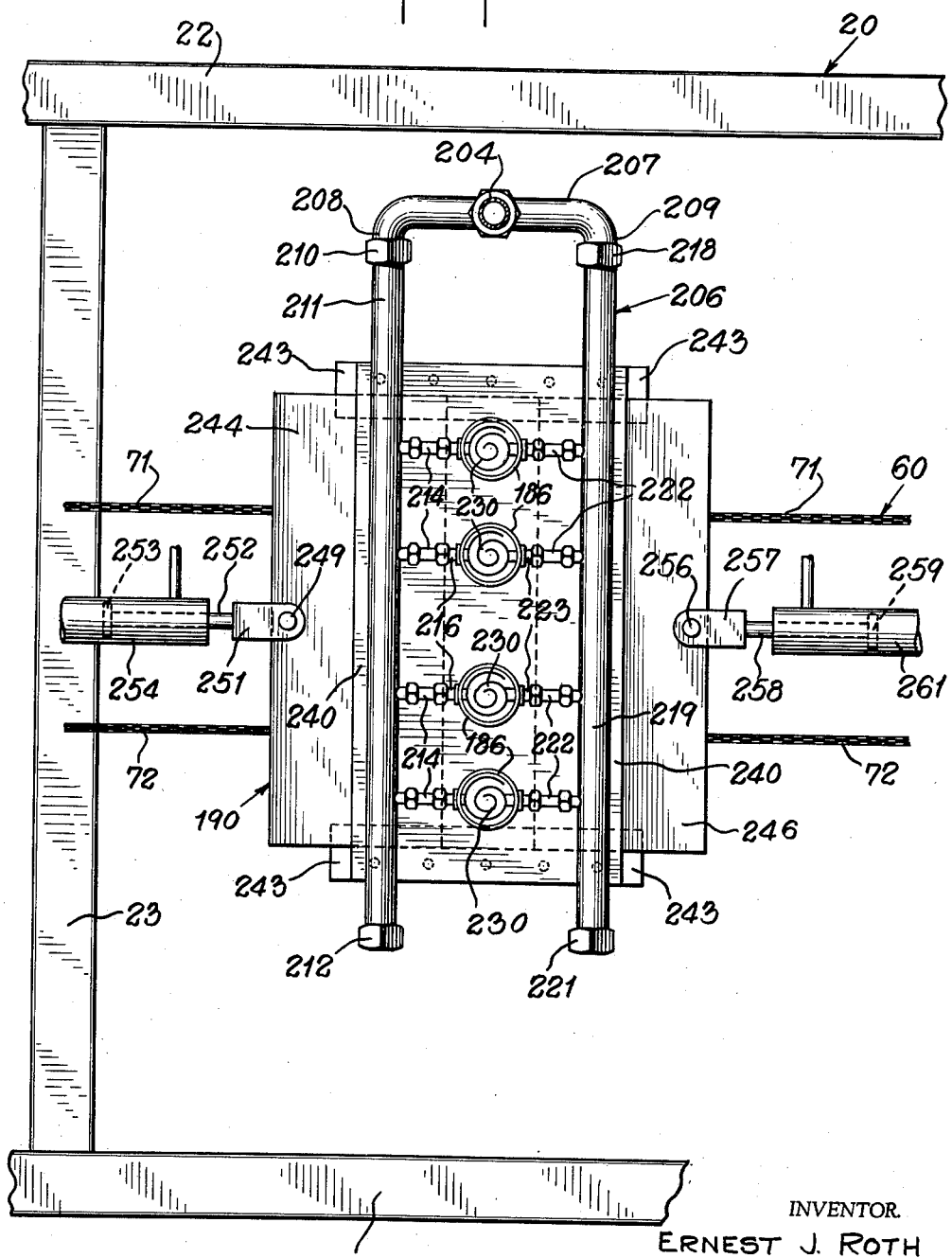

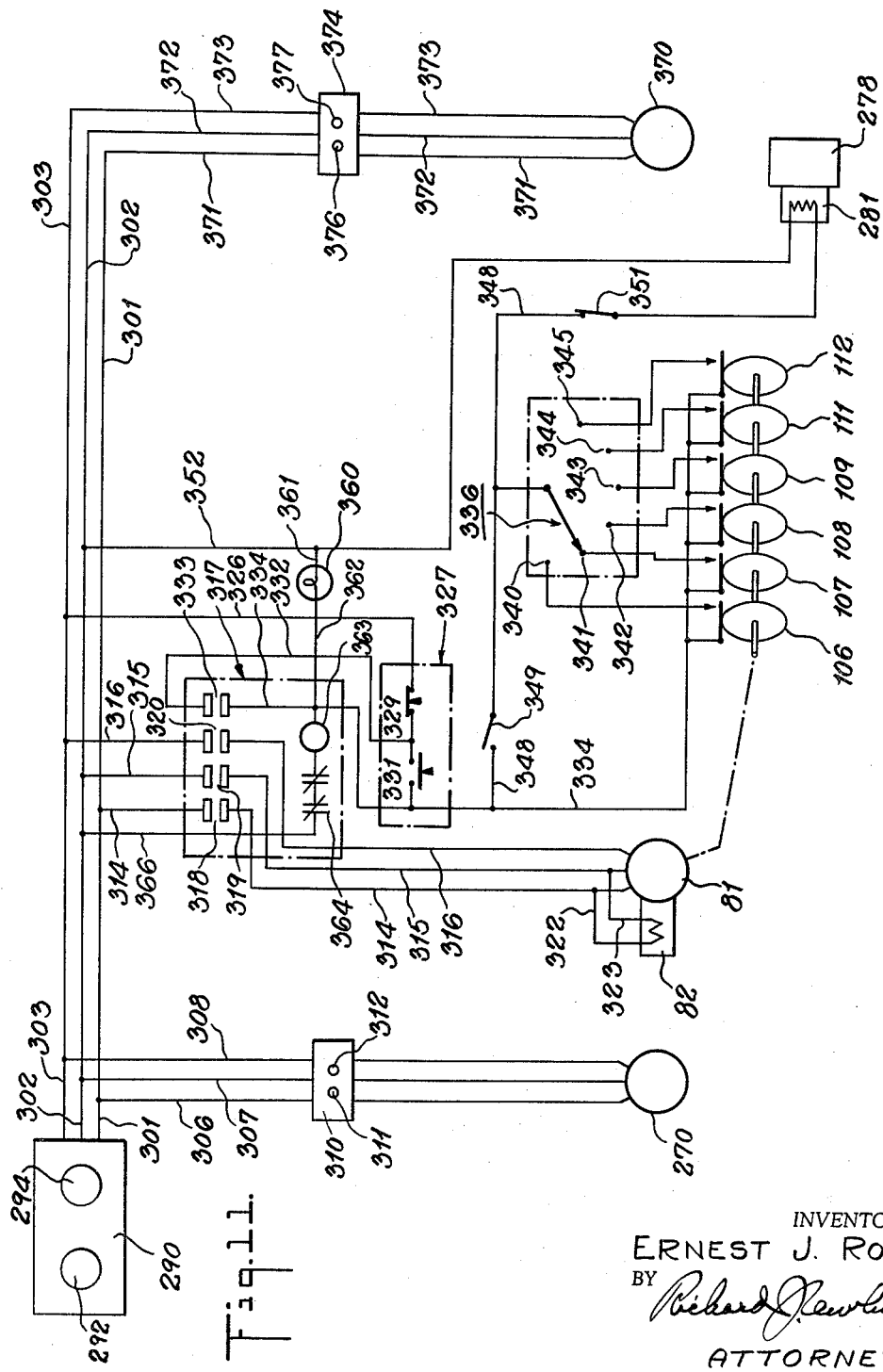

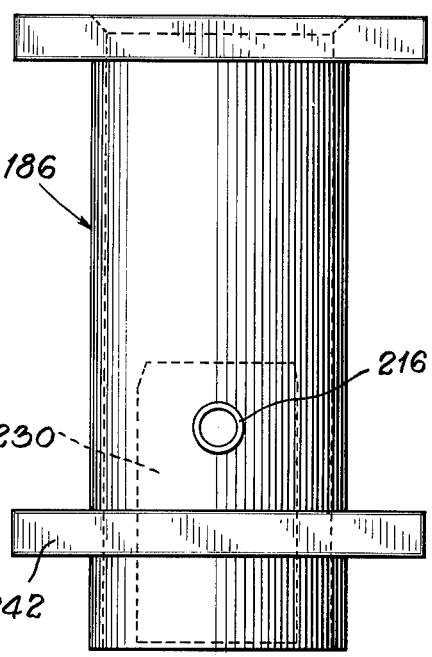
Fig. 15.
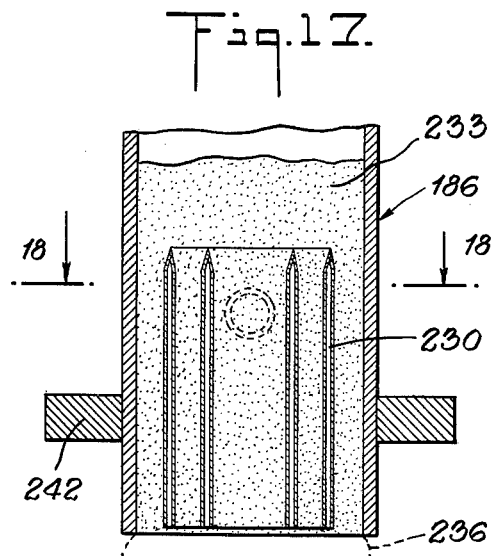
Fig. 17.
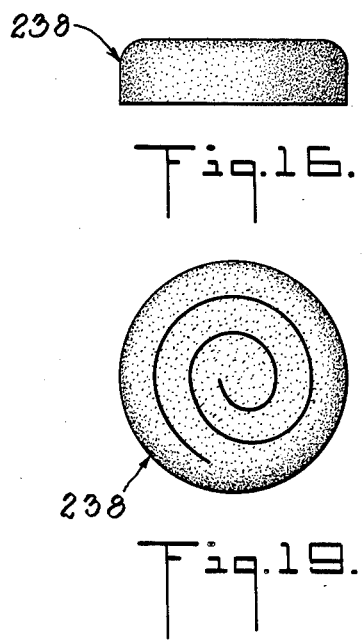
Fig. 16.
Fig. 19.
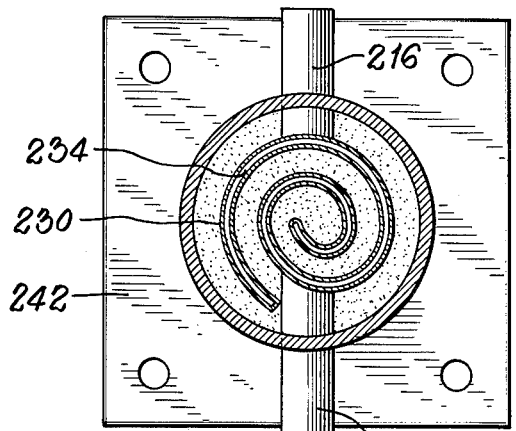
Fig. 18.
INVENTOR.
ERNEST J. ROTH
BY
ATTORNEY United States Patent Office 3,196,810
Patented July 27, 1965

3,196,810
AUTOMATIC MACHINE FOR FORMING, CUTTING AND DEPOSITING FILLED BAKED GOODS
Ernest J. Roth, Englewood, N.J., assignor to Joe Lowe Corporation, New York, N.Y., a corporation of Delaware
Filed July 26, 1963, Ser. No. 297,840
5 Claims. (Cl. 107—1)

The present invention relates generally to a machine for the production of filled baked goods, and it has particular relation to an improved machine for extruding a combined dough and flavoring material in desired shapes, which extrusions are cut uniformly and intermittently deposited accurately and automatically into pans moving continuously along a receiving conveyor.

The most commonly filled bakery product of the type described is the cinnamon bun or roll wherein the cinnamon flavoring extends entirely through and between spiral convolutions of the dough. Obviously, any other shape could be produced by changing the shape of the extrusion dies. Most of such baked goods are presently made by hand, and the operation is expensive, inefficient from a labor standpoint and unsanitary since each individual formation must be handled several times in the course of its manufacture.

One machine is presently on the market for making cinnamon buns in which the dough is injected with spaced globs of fluid flavoring material, and the combination is extruded, cut and deposited into pans in which the products are to be baked. The pans are moved intermittently along a conveyor, which operates under the extrusion nozzle, and the movement of the pans is synchronized with the cutter. This machine has to be custom built for each operation since the pan conveyor is designed to fit the pans of the manufacturer and the intermittent pan conveyor is built to operate with a single size pan.

With the present invention the disadvantages hereinabove set forth have been obviated, and there is provided a machine for making such baked goods, which is capable of manual adjustments without the need of a skilled mechanic, special tools or the services of a maintenance man, to operate with different sizes of pans and different spacings of the deposited raw dough forms.

An object of the invention is the provision of a machine of the class described which is capable of receiving and handling baking pans of various widths and/or depths.

Another object of the invention is to provide a machine of the class described with visual selector means whereby the spacings of the newly formed extrusions can be changed or regulated to fit the standard baking pans currently on the market.

Another object of the invention is the provision of a machine by which filled baked goods, such as cinnamon buns, can be produced automatically at a very substantial savings in labor.

Another object of the invention is the provision of a machine in which the intermittent forming of the extrusions is synchronized with the continuous movement of the pans, which results in an increased production over machines requiring an intermittent feeding of the baking pans.

Another object of the invention is the provision of a machine by which flavor filled dough extrusions, such as cinnamon buns, can be formed, cut and panned automatically at a very substantial savings in labor.

A further object of the invention is to provide an efficient, economical and inexpensive machine on which flavor filled dough extrusions are formed, cut and deposited into pans for baking without requiring handling.

Another object of the invention is the provision of an automatic dialing system whereby the cutting times of the extrusion can be changed at the will of the operator to meet the requirements of different sizes of baking pans.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which:

FIGURE 1 is a side elevational view of the machine, with parts being broken away to better show its operating mechanism;

FIGURE 2 is a fragmentary horizontal sectional view, on an enlarged scale, of the conveyor drive mechanism and hydraulic system, the same having been taken along the line 2—2 of FIGURE 1, looking in the direction of the arrows;

FIGURE 3 is a fragmentary vertical sectional view, on an enlarged scale, of the conveyor drive mechanism, the same having been taken along the line 3—3 of FIGURE 2, looking in the direction of the arrows, and showing the details of one of the cam operating mechanisms;

FIGURE 4 is a vertical sectional view of the conveyor drive mechanism and hydraulic system, the same having been taken along the line 4—4 of FIGURE 3, looking in the direction of the arrows;

FIGURE 5 is a schematic view of the hydraulic system which operates the cutter mechanism;

FIGURE 6 is a vertical sectional view of the means for adjusting the rails which support the baking pans moving under the cutter mechanism, the same having been taken along the line 6—6 of FIGURE 1, looking in the direction of the arrows;

FIGURE 7 is a plan view of the rail adjusting means shown in FIGURE 6, the same having been taken as viewed from the arrows 7;

FIGURE 8 is an enlarged vertical sectional view of the conveyor driving and cutting mechanism, the same having been taken substantially along the line 8—8 of FIGURE 1, looking in the direction of the arrows;

FIGURE 9 is a vertical sectional view of the cutter mechanism, the same having been taken substantially along the line 9—9 of FIGURE 8, looking in the direction of the arrows;

FIGURE 10 is a horizontal sectional view of the cutter mechanism shown in FIGURE 9, the same having been taken substantially along the line 10—10 thereof, looking in the direction of the arrows;

FIGURE 11 is a schematic drawing, showing the electrical wiring system of the machine;

FIGURE 12 is an enlarged detailed view of the peripheral cam track of one of the cams used to control the cutter mechanism, the cam illustrated in this view being a different cam from the cam shown in FIGURE 3;

FIGURE 13 is a vertical view of the cutter mechanism, showing the arrangement of its several extrusion tubes;

FIGURE 14 is a top plan view of a baking pan filled with extruded pieces in the arrangement resulting from use of the cam track shown in FIGURE 12 for operating the cutter head;

FIGURE 15 is a vertical elevational view of one of the extruder tubes of the cutter mechanism, illustrating the position of the flavor injecting nozzle therein;

FIGURE 16 is an elevational view of one of the cut extrusions from the tube shown in FIGURE 15;

FIGURE 17 is a fragmentary vertical sectional view of the extrusion tube shown in FIGURE 15;

FIGURE 18 is a cross-sectional view of the extrusion tube shown in FIGURE 17, the same having been taken substantially along the line 18—18 thereof, looking in the direction of the arrows; and FIGURE 19 is a top plan view of the extrusion shown in FIGURE 16, the same showing the spiral shape of the flavoring material within the dough base.

The machine

Referring now to the drawings and particularly FIGURES 1 and 6, there is shown a side elevational view of a machine embodying the invention. The machine has a box-like frame structure consisting of a rectangular top frame member 20, having spaced side rails 21 and 22 suitably connected transversely at longitudinally spaced intervals by tubular members 23, and a rectangular bottom frame structure 24 having spaced side rails 25 and 26 suitably connected transversely by tubular members 27. The two frame structures 20 and 24 are vertically spaced on a series of legs 28, and are provided with suitable conventional supporting castors 29 for making the machine movable. The castors 29 are capable of individual adjustments for leveling and locking the machine in a fixed position.

The pan conveyor

Referring now to FIGURES 6 and 7, there is mounted on the top main supporting frame structure 20 a pan conveyor 60, consisting of a pair of laterally spaced and longitudinally extending angular tracks or rails 27' and 28', which are mounted adjustably both vertically and horizontally, as hereinafter to be described.

The machine has mounted intermediate its ends and below the rails 27' and 28' a pair of longitudinally spaced transversely extending rods 31 and 32, which are suitably journalled in spaced bearing members 33 and 34. Each rod 31 and 32 has a pair of spaced threaded portions 35 and 36. The threaded portion 35 has right hand threads and the threaded portion 36 has left hand threads. The rods 31 and 32 each has a sprocket wheel 37 keyed adjacent the outer end of the threaded portion 35. The sprocket wheels 37 are in longitudinal alignment. An endless driving chain 41 is entrained over the spaced sprocket wheels 37. The rod 31 has the end adjacent the sprocket wheel 37 extending through its bearing 33 and beyond the side rail 21. It has a wheel 39 keyed thereto, which is provided with a handle 40 for rotating the same.

Each rod 31 and 32 has a pair of spaced blocks 42 and 43 mounted thereon through a horizontally threaded aperture. One block is mounted on each threaded portion 35 and 36. When the rods 31 and 32 are rotated, by turning the handle 40, the blocks 42 and 43 will be moved towards and/or away from one another, depending upon the direction the handle 40 is being turned.

Each of the blocks 42 and 43 also has a threaded aperture extending vertically therethrough for threadingly receiving a vertically extending threaded rod 44 and 46, respectively. Mounted threadingly on each rod 44 and 46 is an inwardly extending arm 48 and 49, respectively. The spaced rails 27' and 28' are welded to the top inwardly extending ends of each pair of arms 48 and 49, respectively.

Each vertically extending rod 44 and 46 has a reduced upper-end. A sprocket wheel 51 is keyed to each of the rods 44, and a sprocket wheel 52 is keyed to each of the rods 46. A chain 54 is entrained over the spaced sprocket wheels 51, and a second chain 56 is entrained over the spaced sprocket wheels 52. The reduced upper ends of each rod 44 and 46 has an enlarged head 57 mounted fixedly thereon, which serves as a manipulating handle for turning the same manually. The chains 54 and 56 each has a U-shaped channel member 58 mounted thereunder and extending through out the length thereof, as best shown fragmentally in FIGURE 7, to prevent sagging. By turning manually one of the enlarged heads 57 at either ends, it is possible to raise and/or lower each side section of the rails 27' and 28' independently since the chain 54 causes the longitudinally spaced arms 48 to be moved vertically together. The chain 56 moves the arms 49 in like manner. By rotating the handle 40, the wheel 39 causes the rod 31 to rotate, and its connecting chain 41 causes the rod 32 to be correspondingly rotated. In this manner the tracks 27' and 28' may be moved simultaneously towards each other or away from each other, depending upon the direction of rotation of the handle 40.

The pan conveyor 60, which moves the baking pans 61 along the tracks 27' and 28', consists of a pair of longitudinally spaced transversely extending shafts 62 and 63 mounted one adjacent each end of the machine (see FIGURES 1 and 2). The shaft 62 has a pair of spaced sprocket wheels 65 and 66 keyed thereto, and the shaft 63 has a similar pair of spaced sprocket wheels 68 and 69 keyed thereto. A chain 71 is entrained over the longitudinally aligned pair of sprocket wheels 66 and 69, and a second chain 72 is entrained over the longitudinally aligned pair of sprocket wheels 65 and 68. The chains 71 and 72 are provided underneath with angular supporting strips 74, which extend throughout their lengths and prevent not only sagging but dripping of any lubricants used on said chains. The chains 72 and 72 each have a series of upright fingers 75 mounted thereon in any suitable manner and spaced longitudinally and oppositely for engaging the rear or trailing edge of the baking pans 61 to move them forwardly along the tracks 27' and 28'.

Referring now to FIGURES 1, 2, 3 and 7, there is shown the driving mechanism for the pan conveyor 60 and the timing cams (hereinafter to be described) for controlling the operation of the cutter mechanism. As best shown in FIGURE 2, the driving power is secured from an electric motor 81, which is equipped with a conventional friction brake 82 to prevent said driving mechanism for the pan conveyor 60 and timing cams controlling the cutter mechanism from moving after the current to the electric motor 81 is cut off. The motor 81 is mounted on an adjustable base 83. The base 83 is movable by manipulation of the handle 84. The motor 81 is connected to a conventional reduction gearing unit 86 through a variable pulley 87, belt 88 and pulley 89. The reduction gearing unit 86 has two output or drive shafts 91 and 93 (see FIGURE 2). The drive shaft 91 has a keyed sprocket wheel 94, which drives a chain 96 entrained over a second sprocket wheel 97, which is keyed to a shaft 98. The shaft 98 is suitably journalled in end bearing members 101 and 103 mounted on suitable supports forming a part of the frame structure 24.

The drive shaft 98 carries a series of spaced pairs of timing cams 106–107, 108–109 and 111–112 mounted fixedly thereon. These timing cams will rotate continuously as long as the motor 81 is running. It will be noted in FIGURES 2 and 3 that each timing cam is provided with a conventional limit switch 117. Each switch 117 is provided with an outwardly extending bifurcated arm 118, which, in turn, has at its free outer end a roller or cam follower 119 (see FIGURE 3). Each cam follower 119 engages the peripheral cam track 121 of its contiguous cam. When the cam follower 119 reaches each of the peaks 122 on the peripheral cam track 121 of the cam 107 (see FIG. 3), it will be noted the arm 118 is moved into the position shown in FIGURE 3. If its switch 117 is being energized with electricity from the selective dial, the cutter mechanism will be operated by said cam. The lengths of the valleys 123 of the peripheral cam track 121 control the time between consecutive operations of the cutter mechanism and the longitudinal spacing between consecutive transverse rows of deposits.

The shaft 93 of the reduction gearing unit 86 has a fixed sprocket wheel 126, which drives a chain 127. The opposite end of the chain 127 engages a sprocket wheel 129, which is keyed to a shaft 131 extending transversely of the upper frame structure 20 and journalled in bearings 132 and 133 mounted on the side rails 21 and 22 thereof. The shaft 131 has a second sprocket wheel 136 keyed thereto, which drives a chain 137. The chain 137 extends longitudinally forwardly of the machine and drives a sprocket wheel 141 keyed to the shaft 62 located at the forward or discharge end thereof (see FIGURE 2). This arrangement provides a continuous drive for the conveyor chains 71 and 72 when the motor 81 is operating. The shaft 131 also has keyed thereto a ratchet assembly, which permits adjustment of the pan conveyor 60 while it is in operation. This may be accomplished by grasping manually the peripheral edge of the wheel 143 forming a part of said ratchet assembly, which has an enlarged hand gripping bead 144, for turning it in the direction in which it is rotating on its shaft while it is in operation. This ratchet assembly forms no part of the present invention, but is shown, described and claimed in my co-pending application Serial No. 177,863, filed March 6, 1962, now Patent No. 3,154,187.

The dough tank

Referring again to FIGURE 1, a large dough tank 150 is mounted on a supporting structure 151, which is, in turn, suitably mounted on top of legs 152 on the frame structure 20. The top of the dough tank 150 is equipped with a conventional pressure sealing removable cover 154 adapted to be released and/or locked into a fixed position by turning a suitable manipulating wheel 156. The tank 150 carries a conventional pressure release safety valve 157.

A pneumatic pressure system is connected to an outside source of supply (not shown) through a pipe line 158, which leads into a conventional air filter 159. The air filter 159 passes the filtered air into a pipe line 161, which, in turn, has its opposite end connected to an air manifold 162. The air manifold 162 has three outlets. One outlet is connected to a feed pipe 164, having a pressure regulating valve 166 and pressure gauge 167. The feed pipe 164, which leads into the dough tank 150 through the sidewall adjacent to its top has a cut-off valve 165. The second manifold outlet has a pipe 169 leading to a manifold pressure gauge 171. The third manifold outlet has a feed pipe line 172 equipped with a pressure regulating valve 173 and pressure gauge 174. The pipe 172, leading into the flavor tank 180 through the sidewall adjacent to its top, has a cut-off valve 176.

The bottom of the dough tank 150 (see FIGURE 9) slopes or converges, as indicated at 181, and its reduced end is provided with clamping bars 182. The bars 182 attach removably a restricted throat member 183 thereto by means of bolts 187. Extrusion tubes or dies 186 are, in turn, removably secured to the lower end of the throat member 183 by a series of spaced bolts 189. The lower or outer end of each die tube 186 leads into a cutter head mechanism 190 hereinafter to be more fully described.

The flavor tank

The flavor tank 180, which is shown in FIGURE 1 as being slightly smaller in size than the dough tank 150, is likewise suitably mounted on a supporting structure 191 having legs 192 mounted on the top of the main frame structure 20. The tank 180 is provided with a conventional releasable pressure sealing top cover plate 194, which is secured by wing bolts and nuts 196. A plate 197, having a handle 198, is provided as a floating follower within the tank 180 and completely covering the top surface of the flavoring material contained therein. This is essential because the flavoring material in the tank 180 is forced out by pneumatic pressure obtained through the pipe line 172, and, at certain viscosities and consistencies, the pneumatic pressure without such a follower plate tends to penetrate and form cavities in the top surface of such flavoring materials with resulting irregular deliveries or none at all.

The bottom of the tank 180 is concave, as indicated at 201, and has a single axial outlet 202, which is connected to a pipe 204 equipped with a series of spaced sanitary couplings for easy dismantling for cleaning purposes. The pipe 204 conveys the flavoring material forced from the flavor tank 180 into a connecting U-shaped manifold 206.

Referring now to FIGURE 10, the manifold 206 consists of a U-shaped end member 207, which is connected to the pipe 204 centrally of its ends 208 and 209. The end 208 of the member 207 is connected through a sanitary coupling 210 to a straight section of pipe 211, which is closed at its outer end by a sanitary cap 212. The pipe 211 passes along one side of the row of spaced die tubes 186, leading from the dough tank 150, and through a series of spaced sanitary fittings 214. The fittings 214 provide a pipe line 216 leading one each to said die tubes 186. The opposite end 209 of the member 207 is likewise connected by a sanitary coupling 218 to a parallel section of straight pipe 219 leading along the opposite sides of the row of spaced die tubes 186. The pipe line 219 is closed at its outer end by a sanitary cap 221. A series of spaced sanitary fittings 222 are connected through the pipe lines 223 one each to the opposite sides of said die tubes 186. Obviously, when pressure is exerted on the follower plate 197, the flavoring material in the flavor tank 180 is forced out through its bottom, through the connecting pipe line 204 to the member 207, where it is divided into two streams, one each passing into the pipes 211 and 219. In this manner a stream of flavoring material is delivered to each side of each of the dough die tubes 186 from opposite sides thereof into the axially mounted flavor forming die tubes 230.

Referring now to FIGURE 15 through 19, there is shown an enlarged diagrammatical view of the detailed arrangement of the combined die tubes 186 and 230, wherein the raw dough 233 encircles and encloses the flavoring material 234 from which combination the biscuit or cake 238 is formed. The present embodiment shows merely four die tubes 186, but it is understood these may be increased or decreased in number as desired.

In FIGURE 15, the dough die tube 186 is illustrated with its flavor die tube 230 suitably mounted axially therein with one of the flavor inlet openings 216 being shown passing through the die tube 186.

FIGURE 16 shows a side elevational view of a single raw dough formation 238 after the same has been severed from the die tube 186.

FIGURE 17 shows the combined die tubes 186 and 230 of FIGURE 15 with portions being broken away and/or cut away to better illustrate how the raw dough 233, entering at the top, is forced over and around the spiral die tube 230 centrally mounted in spaced relation therein for introducing the flavoring material 234 into the raw dough 233, whereby, when both materials reach the discharge ends of their respective forming or extrusion dies 186 and 230, they are combined into the form of a single continuous extrusion 236 (see FIGURE 9) consisting of an outer layer of dough 233 having a spiral formation of flavoring material 234 formed therein and extending substantially axially thereof. A top plan view of the bun or biscuit formed by the severed dough piece 238 is shown in FIGURE 19.

The cutter head mechanism

Referring now to FIGURES 8, 9 and 10, there is shown the details of the cutter head mechanism 190, which is mounted directly below and contiguous to the discharge ends of the series of spaced die tubes 186 leading downwardly from the dough tank 150.

The cutter head mechanism 190 comprises a large flat metal plate 240, having a series of spaced vertical apertures 241 therethrough. A series of spaced squared shaped plates 242 are mounted above the plate 240, one each encircling the lower end of the die tubes 186. These plates 242 are welded or otherwise secured fixedly to the plate 240 for anchoring the die tubes 186 in alignment with the apertures 241 therethrough. An intermediate narrow bar 243 and wider bar 245 are bolted to the underside of the front and back edges of the plate 240, forming a guideway for receiving the sliding cutter blades 244 and 246, as best shown in FIGURE 8. Each cutter blade 244 and 246 has a reduced inner edge 247 (see FIGURE 9). The edges 247, when brought quickly together, will pinch off the extrusion of dough 236 being discharged from the lower ends of the die tubes 186.

The outer end of the cutter blade 244 is connected by a pin 249 to a bifurcated arm 251, whose opposite end is connected, in any suitable manner, to the projecting end 252 of a piston rod extending outwardly of a cylinder 254 (see FIGURES 9 and 10). The outer end of the cutter blade 246 is likewise connected by a pin 256 to a bifurcated arm 257, whose opposite end is connected, in any suitable manner, to the projecting end of a piston rod 258 extending from a piston 259 within a cylinder 261. The hydraulic cylinders 254 and 261 are suitably anchored to the main frame structure 20 at their outer ends, as indicated at 263.

The hydraulic system

The hydraulic system for operating the cutter head mechanism is shown schematically in FIGURE 5.

It consists of an electric motor 270, which through a flexible coupling 271, is connected with a hydraulic pump 272. The pump 272 secures its hydraulic fluid from a suitable reservoir 274 through its connecting pipe line 276. The pump 272 discharges its hydraulic fluid through its outlet pipe line 277, which delivers it to a spring return four-way valve 278 of conventional construction and which is operated by a solenoid 281. The four-way valve 278, in its normal position, is de-energized. The four-way valve 278 delivers the hydraulic fluid under pressure through a pipe line 282 to a conventional flow divider 283. The flow divider 283 will insure equal distribution of the hydraulic fluid to each of its connecting pipe lines 286 and 287. The pipe line 286 carries its hydraulic fluid to the back end of the cylinder 254, and thereby forces its piston 253 outwardly, whereupon its piston rod 252 moves its attached cutter blade 244 inwardly towards the cutter blade 246. The pipe line 287 carries its hydraulic fluid to the back end of the cylinder 261, and forces its piston 259 outwardly, whereupon its piston rod 258 will force its attached cutter blade 246 inwardly towards the cutter blade 244. The limits of the stroke of each cutter blade 244 and 246 is at their exact meeting point in the center of the die tubes 186, whereupon the blades 244 and 246, when meeting, pinch off the combined dough extrusion 236 into individual pieces 238, as best shown in FIGURE 16. The cutter blades 244 and 246 are normally held in a closed position, preventing extrusions 236 from the die tubes 186 as long as the hydraulic pump 272 remains in operation.

In order to open the cutter blades 244 and 246 to permit further extrusions, the solenoid 281 of the valve 278 must be actuated electrically through its controlling cam. When the valve 278 is so actuated, the hydraulic fluid will be forced from the four-way valve 278 into the pipe line 291, then into the pipe lines 292 and 293, leading respectively to the inner ends of the cylinders 254 and 261, causing their pistons 253 and 259, respectively, to be forced backwardly or inwardly to withdraw the cutter blades 244 and 246. The pipe line 295, leading from the four-way valve 278, is a by-pass pipe line, flowing back into the reservoir 274.

The schematic wiring diagram

Referring now to FIGURE 11, there is shown schematically the wiring diagram for the various electrical components embodied in the machine. This schematic drawing is in accordance with the electrical format approved by the Joint Industrial Congress (J. I. C.) Electrical Standards for Industrial Equipment, as adopted and revised March 20–27, 1957.

The machine receives its current from an outside source of supply not shown, and is equipped with a main operating switch 290, having a start button 292 and stop button 294, through which the incoming wires 301, 302 and 303 are energized.

The motor 270, driving the pump 272 for the hydraulic system, is provided with its own circuit from the wires 301, 302 and 303 through the wires 306, 307 and 308. The wires 306, 307 and 308 pass through a manual control switch 310, which has a starter button 311 and stop button 312.

The pan conveyor motor 81 receives its electrical energy through the wires 314, 315 and 316. The wires 314, 315 and 316 pass through a conventional relay 317, having series of spaced contacts 318, 319 and 320, respectively, and are then connected to the main circuit wires 301, 302 and 303, respectively. The friction brake 82 is energized through the wires 322 and 323, which are, in turn, connected to the wires 314 and 315, carrying current to the motor 81, which also drives the cams 106, 107, 108, 109, 111 and 112.

A wire 326 connected with the main circuit wire 303 leads into a switch 327, having a stop button 329 and a starter button 331. The stop button 329 has a wire 332 connecting it to one side of an electric contact 333 of the relay 317. The starter button 331 is likewise connected to the electric contact 333 of the relay 317 through the wire 332. The opposite side of the relay contact 333 has a wire 334 passing through the opposite side of the starter button 331, which leads to the visual or dial selector switch 336. The dial selector switch 336 has six dial contacts 340, 341, 342, 343, 344 and 345, which are connected respectively to the micro-switches 117 for each of the cams 106, 107, 108, 109, 111 and 112. The line 334 has a line 348, which is provided with a single pole by-pass switch 349, connecting with the dial selector 336. This switch 349 enables the operator to cut out the cutter mechanism 190 without stopping the pan conveyor 60. The line 348 passes through a second single pole switch 351 and is connected to one side of the solenoid 281 that operates the four-way valve 278 that, in turn, controls the operation of the cutter-head mechanism 190. The solenoid 281 has a line 352 which connects back to the main line 302 to complete its circuit. The switch 351 permits the operator to shut off the current supplied to the solenoid 281 in order to stop the cutter 190 to check the weight of the dough extrusions 236.

A pilot light 360 has one side connected by a wire 361 to the wire 352 of the circuit which includes the solenoid 281. The opposite side of the pilot light 360 is connected by a wire 362 to the wire 334 in the circuit including the switch 327 and the cam selector dial switch 336. The wire 362 after connecting with the wire 334 is connected in series through a holding coil 363 and overload relay 364 to a wire 366 that, in turn, leads back to the main circuit wire 302. Thus, the pilot light 360, holding coil 363 and overload relay 364 are energized whenever the starter button 331 is energized. The overload relay 364 serves to protect the coil 363.

The schematic drawing also includes a wiring diagram for a compressor motor 370 in the event one is required to supply pneumatic pressure to the pipe line 158 in the event the plant where the machine is installed does not have a pneumatic pressure system. The motor 370 is shown connected by the wires 371, 372 and 373 through a switch 374, having a starter button 376 and stop button 377, to the main circuit wires 301, 302 and 303, respectively. However, in the present embodiment, no compressor motor 370 is needed since pneumatic pressure is obtained from an outside source of supply through the pipe line 158.

The operation of the machine

The basic operation of the machine is to combine two substances, one substance being a basic dough and the other substanct a flavoring material, into a single extrusion that is discharged through a single die outlet into especially designed cutters, which will cut the combined dough extrusions 236 into uniform pieces 238 for gravitation into continuously moving baking pans 61 passing directly underneath the cutter blades 244 and 246. The pans 61 are fed manually into the machine by an operator, moved synchronously through the machine by fingers 75 on the pan conveyor 60 and taken off by a second operator. A third operator controls the starting and stopping of the machine, checks the weight of the cut pieces 238 and keeps the dough and flavor tanks 150 and 180, respectively, supplied with dough 233 and flavoring material 234.

It will be obvious that the machine must be stopped from time to time to refill the dough and flavor tanks with additional material. However, if a continuous operation is desirable, the machine may be equipped with two dough tanks and two flavor tanks, and they may be used alternately so that the machine will not have to be stopped for refilling as required when the same is equipped with a single supply tanks. When one set of tanks becomes empty, the operator can switch to the second set of tanks while he refills the first set of tanks.

The machine illustrated in the drawing has a maximum extruding capacity of approximately 1500 pounds of dough and flavoring material per hour. The number of individual pieces that can be cut will be dependent upon the size of the finished product to be made. The individual cuts or deposits may be varied in size from approximately ¾ ounce to 3 ounces, depending upon the size of the die extrusion tube and cutters used on the machine. The cutter head assembly, being removably secured to the bottom of the dough tank, is readily removable for cleaning and/or changing of the die tubes for making another size or shape of product. The weight of each of the extrusions may be varied by changing the pressure supplied to the tops of the dough and flavor tanks.

It will be appreciated that a very small extrusion will not drop as quickly as a heavier large extrusion, and, therefore, the speed of cutting must be adjusted accordingly. The machine, as previously described, is equipped with a motor 81, having a conventional adjustable base 83, variable speed pulley 87 and belt 88. The motor 81 has a variable speed indicator 280, which is calibrated to indicate the speed of the motor in "cuts per minute," and is driven by a chain 381 connecting it to the drive shaft of the motor, as best shown in FIGURE 1.

The operator in starting the machine first turns on the hydraulic system, by pressing the starter button 311, which, in turn, will energize the electric motor 270, which drives the pump 272. Hydraulic pressure is now being supplied to the cutter head mechanism 190.

By opennig the manual valves 165 and 176 in the air lines 164 and 172, leading to the dough tank 150 and flavor tank 180, respectively, pressure will be exerted on the top of the dough in the dough tank 150 and on top of the follower plate 197 in the flavor tank 180. These tanks 150 and 180 are operable under pressures between 35 and 90 pounds per square inch. Each dough and flavor formula will require a different operating pressure for optimum performance, which must be determined by trial runs. The operator now turns the selector dial 336 to the cam operation desired, presses the starter button 331, which will start the electric motor 81 driving the reduction gear unit 86, which, in turn, drives the pan conveyor 60.

The selector dial 336 will cause the cam selected (which in FIGURE 11 is cam 107) to energize the circuit to the solenoid 281, which controls the operation of the four-way valve 278 that controls the opening and closing of the cutter blades 244 and 246. When the blades 244 and 246 are opened, the combined dough and flavor will be extruded under pneumatic pressure, as indicated at 236, from the bottom of each of the die tubes 186. The amount of the extrusion is obviously dependent upon the amount of pneumatic pressure in the dough tank 150 and flavor tank 180, which pressures are always equal due to the air manifold 162 (such pressure can be regulated by the pressure regulator valves 166, and can be determined by reading the pressure gauge 167) and the length of time the cutter-blades 244 and 246 remain open, which time is determined and controlled by the respective cam selected.

Referring to FIGURE 12, there is illustrated the peripheral cam track of the cam 109, which shows a series of peaks spaced at different circumferential distances, as indicated by the numerals 381, 382, 383, 384, 385 and 386. These peaks operate the cutting sequences, i.e., when the cam follower passes over such peaks, its limit switch is energized opening said cutter-blades 244 and 246 momentarily, permitting the extrusion 236 shown in FIGURE 9, forming the bun 238 shown in the pan 61. The concaved portions 388, 389, 390, 391, 392 and 393 of the peripheral cam track controls the periods during which the cutter blades 244 and 246 remain closed, thereby preventing extrusions from the lower ends of the die tubes 186.

There is shown in FIGURE 13, the actual spacing arrangement of the die tubes 186. It will be noted that they are in transverse alignment on the machine so as to deposit a transverse row of combined extrusions, now being indicated as dough formations 238, in the pans 61. It will be noted that the die tubes 186 are arranged in spaced pairs with a wider spacing at the center. To change this arrangement of the dough deposits 238 in a single row, it is necessary to change the die head on the machine.

Referring now to FIGURE 14, there is illustrated a pan 61 completely filled with dough formations 238 provided by the cam 109 shown in FIGURE 12. The concave section of the cam track, indicated at 390, controls the spacing of the deposits between pans indicated at 390a. The section of the cam track, indicated by the number 391, controls the spacing between rows indicated by the number 391a in FIGURE 14. The section of the cam track indicated by the number 392 controls the spacing between rows indicated by the number 392a. The section of the cam track indicated by the number 393 controls the spacing between rows indicated by the number 393a. The section of the cam track 388 controls the spacing between the rows indicated by the number 388a. The section of the cam track 389 controls the spacing between the rows indicated by the number 389a. The aforementioned illustration and spacings 388a, 389a, 390a, 391a, 392a and 393a apply only to the pan 61. Whenever a different size pan is to be used, the appropriate cam must be selected since each cam is designed for a single size pan.

It will thus be apparent that with six different cams 106, 107, 108, 109, 111 and 112, each having its own eccentric peripheral cam track, the operator may, merely by dialing, select a different deposit spacing arrangement for the dough formations 238, which means that six different kinds and sizes of baking pans 61 may be used in the machine by an unskilled operator. The width or space between the tracks 27' and 28' can be adjusted, as previously indicated, merely by rotating the handle 40. In this manner the tracks 27' and 28' may be spaced to receive different widths of baking pans in use in the industry. It is not desirable to drop the severed dough pieces 238 too great a distance. Therefore, the adjustment controlled by the heads 57, as previously indicated, permit raising and/or lowering the tracks 27' and 28' with respect to the cutter-head mechanism 190.

There is shown in FIGURE 1 below the conveyor 60 and in vertical alignment with the cutting knives 244 and 246 a removable open-top container 400, sitting on the frame structure 24, for catching severed extrusions 238 gravitating from the forming dies 180 when no baking pan 61 is on the conveyor 60 in alignment therewith.

While I have shown and described but one form which the invention may assume, it will be readily apparent to those skilled in the art that the invention is not to be so limited, but that various other and further modifications may be made therein without departing from the spirit thereof.

What I claim is:
1. In a machine of the class described having
   (a) a dough tank connected with a dough extrusion die,
   (b) a flavor tank connected with a flavor extrusion die,
   (c) means for continuously forcing dough from said dough tank to said dough extrusion die,
   (d) means for continuously forcing flavor from said flavor tank to said flavor extrusion die,
   (e) said flavor die being mounted in spaced relation within said dough die so that a composite extrusion will be formed and discharged having the flavor surrounded with the dough,
   (f) cutting means mounted adjacent the discharge end of said dough die for normally closing the same,
   (g) means for intermittently opening said cutting means for permitting a composite extrusion to be discharged therefrom and then severing the same to form an individual piece for baking into a finished product,
   (h) a conveyor operating continuously below said cutting means for conveying along spaced rails a series of baking pans to receive the severed individual pieces of dough from said cutting means, and
   (i) means including a visual selector and a series of different cams for synchronizing the intermittent operation of said cutting means with the continuous movement along said rails of said baking pans whereby different sizes of baking pans may be filled with properly spaced severed dough pieces.

2. In a machine of the class described having
   (a) a dough tank connected with a dough extrusion die,
   (b) a flavor tank connected with flavor extrusion die,
   (c) means for continuously delivering dough from said dough tank to said dough extrusion die,
   (d) means for continuously delivering flavor from said flavor tank to said flavor extrusion die,
   (e) said flavor die being mounted in spaced relation within said dough die so that a composite extrusion will be formed and discharged having the flavor surrounded with the dough,
   (f) cutting means mounted adjacent the discharge end of said dough die for normally closing the same,
   (g) means for intermittently opening said cutting means including a series of synchronizable cams for permitting a composite extrusion to be discharged from said dough die and then severing the same to form an individual piece for baking into a finished product,
   (h) a conveyor operating continuously below said cutting means for conveying a series of baking pans to receive the severed individual pieces from said cutting means, and
   (i) means for selecting one of said series of synchronizing cams for effecting a different timing sequence for operating said cutting means, whereby different sizes of baking pans may be carried by said conveyor for filling with properly spacing severed dough pieces.

3. In a machine of the class described having
   (a) a dough tank connected with a series of spaced dough extrusion dies,
   (b) a flavor tank connected with a corresponding series of spaced flavor extrusion dies,
   (c) means for delivering equal quantities of dough continuously from said dough tank to each of said dough extrusion dies,
   (d) means for delivering equal quantities of flavor continuously from said flavor tank to each of said flavor extrusion dies,
   (e) said flavor extrusion dies being mounted one each within said dough extrusion dies so that a composite extrusion will be discharged from each of said dough extrusion dies having the flavor substantially surrounded with the dough,
   (f) cutting means mounted adjacent the discharge ends of said dough extrusion dies for normally closing the same,
   (g) a conveyor operating continuously below said cutting means for conveying a series of baking pans to receive the severed individual composite extrusions,
   (h) said cutting means being operated hydraulically and being opened and closed by means of a four way valve controlled by a solenoid,
   (i) said solenoid being connected in an electric circuit with a dial selector switch having a series of spaced contacts,
   (j) said contacts being each connected in an electric circuit to one of a series of limit switches which are opened and closed by cams which rotate continuously when said pan conveyor is in operation,
   (k) each of said cams being capable of effecting a different timing sequence of the open period of said cutting means whereby said selector switch may be changed by dialing to synchronize the cutting means with a particular size of baking pan being carried on said conveyor so that said pan may be filled with properly spaced rows of spaced composite dough extrusions.

4. A machine in accordance with claim 3, wherein said electric circuit has a switch connected with said dial selector switch to permit the operator to stop the cutting means without stopping the pan conveyor.

5. A machine in accordance with claim 3, wherein said electric circuit has a switch connected with said solenoid to permit the operator to stop the cutting means in order to check the weight of the individually severed dough extrusions.

References Cited by the Examiner

UNITED STATES PATENTS

| | | | |
|---|---|---|---|
| 970,370 | 9/10 | Green | 107—29 |
| 1,933,557 | 11/33 | Kalvin | 107—14.1 X |
| 1,961,661 | 6/34 | Fuller | 197—24 X |
| 1,973,196 | 9/34 | Baker | 107—7.2 |
| 2,542,239 | 2/51 | Engels et al. | 107—29 |
| 2,590,823 | 3/52 | Rhodes | 107—7.2 X |
| 2,982,231 | 5/61 | Fries | 107—1.4 |

WALTER A. SCHEEL, *Primary Examiner.*

CHARLES A. WILLMUTH, *Examiner.*